United States Patent Office 3,232,245
Patented Feb. 1, 1966

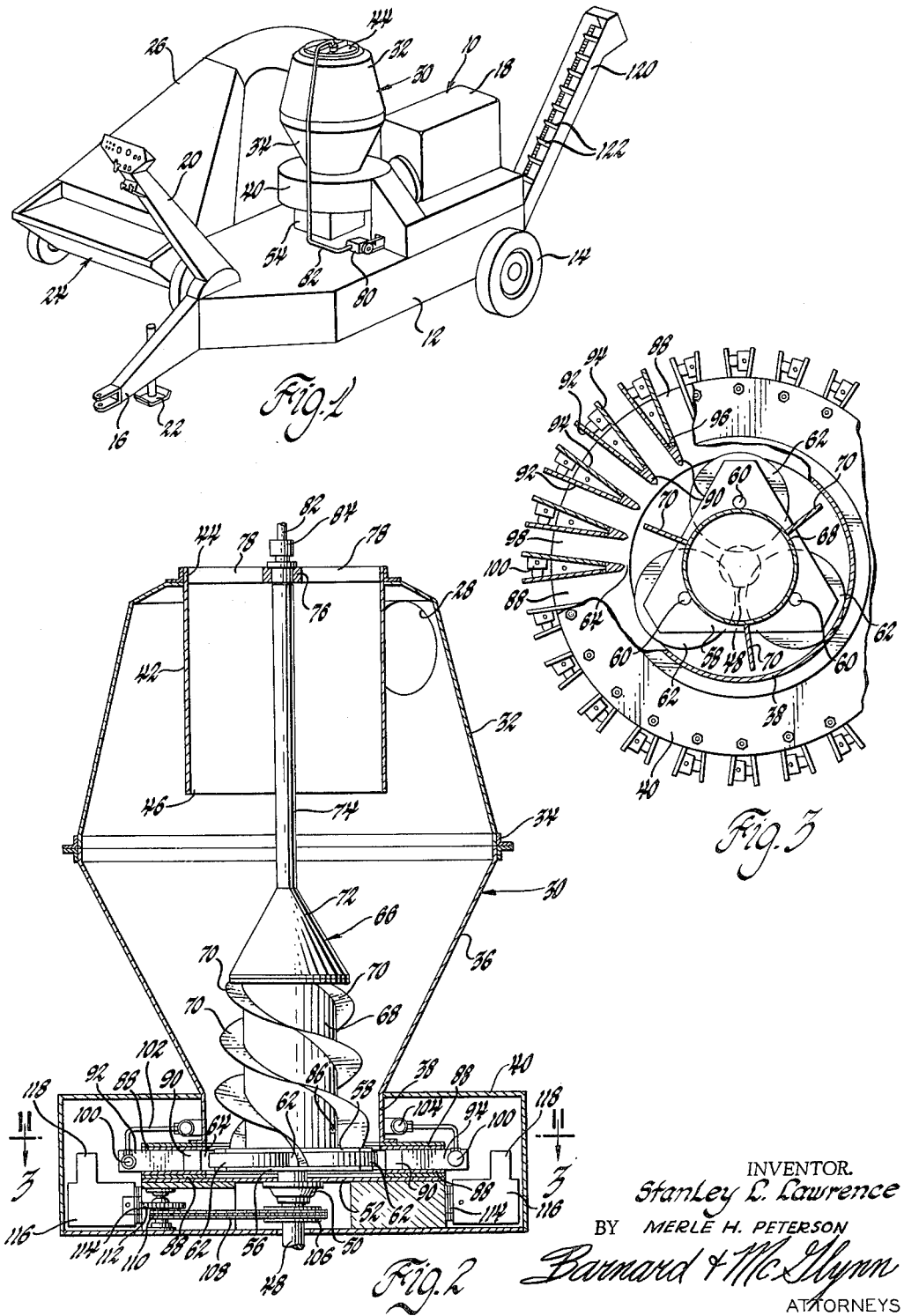

3,232,245
FEEDING AND COMPACTION MEANS FOR HAY WAFERING APPARATUS
Stanley L. Lawrence and Merle H. Peterson, Livonia, Mich., assignors to Massey-Ferguson Inc., Detroit, Mich., a corporation of Maryland
Filed Aug. 23, 1962, Ser. No. 219,010
13 Claims. (Cl. 107—14)

This invention relates to an apparatus for producing hay wafers and, in particular, to an improved apparatus for field wafering forage crops into hay wafers which is particularly characterized by an improved hay feeding and compaction means.

In recent times, apparatus have been devised for field wafering forage crops into hay wafers comprising means for supplying hay, preferably preconditioned or processed, finely chopped, mixed and blended hay from a windrow within a field, to a hopper communicating with a wafering chamber at one end thereof which, in turn, communicates with the entrance ends of an annular series of axially open radially extending die cells disposed circumferentially about the aforementioned wafering chamber. Such apparatus have further included a rotatable drive shaft extending through the hopper and wafering chamber substantially coaxially with the annular series of die cells, a two flight feed auger being provided on a portion of the drive shaft within the hopper for feeding hay from the hopper to the wafering chamber as the shaft rotates. In addition, means such as a pair of radially extending arms have had their respective central portions fixed in axially spaced relation along another portion of the drive shaft within the wafering chamber, and have rotatably mounted a pair of compression or compaction rollers therebetween respectively at the opposite ends thereof so that, as the drive shaft rotates, the arms are driven and travel in a rotative path closely spaced from the entrance ends to the die cells. Thus, the feed auger feeds hay to the wafering chamber and lays it along the entrance ends to the die cells for compression or compaction into and therethrough upon successive passes of the rollers applying force thereto. As a result, as such an apparatus moves through a field of mown hay, a continuous extrusion of compressed or compacted hay of substantially uniform quality, constituency, shape and density emerges from the exit ends of the respective die cells, and each extrusion is adapted to be engaged with ejection means adjacent the exit end of each of the die cells to break the respective extrusions of hay into hay wafers of substantially uniform length which then preferably fall upon a conveyor means for removal from the apparatus.

In an apparatus of the type aforementioned, a problem is often encountered due to a collection of hay forming in the wafering chamber along a group of the die cells in the path of one or more or both of the compaction or compression rollers, which collection of hay is sufficiently large as to resist rolling movement of the associated roller thereover to force such hay into the adjacent die cells. Under such conditions, the rollers have a tendency to push the collection of hay in front thereof as they repeatedly travel their rotative paths about the wafering chamber, thereby detracting from the efficiency of the wafering apparatus and reducing the production of hay wafers therefrom. As a matter of first impression, it would appear that this problem could be solved merely by increasing the diameters of the rollers thereby increasing the angle of rolling attack and contact thereof with such collections of hay to compress the latter through the die cells rather than pushing them in advance of the rotative path of the rollers. Unfortunately, the drive assembly of the usual pair of compaction rollers to the rotatable drive shaft through the intermediary of the radial arms aforementioned has prevented increasing the diameters of the rollers to an appreciable extent to solve this problem.

More specifically, and as pointed out above, the usual pair of compaction or compression rollers are respectively rotatably journaled as by pivot pins extending between the opposite ends of a pair of radial arms having their central portions respectively secured in axially spaced relation along the rotatable drive shaft. Thus, drive is transmitted directly from the shaft to both arms to rotate the rollers, and also to drive the feed auger. In order to make any appreciable change in the diameters of such a pair of rollers, it is necessary to eliminate the portion of the drive shaft extending between the aforementioned arms to provide the necessary clearance. As a consequence, if this portion of the drive shaft is eliminated, rotary torque transmission or drive would be conducted from the drive shaft to one of the radial arms secured thereto, and through the pivot pins rotatably supporting the respective rollers to the other radial arm and the feed auger, and the torsional forces and other stresses imposed on the pivot pins in conducting drive therethrough in this manner would be excessive and lead to failure of the rotary hay compaction or compression mechanism.

Thus, the present invention contemplates an improved apparatus for making compressed hay wafers and of the general type aforementioned having an annular series of radially extending die cells circumferentially spaced about and having entrance ends thereof communicating with a wafering chamber to receive hay therefrom to be wafered, and particularly characterized by a rotary hay compaction or compression mechanism including a rotatable drive shaft, roller mounting means including a pair of spaced mounting members or plates with one thereof drivingly connected to the shaft, at least three spaced pivot pins or the like extending between the mounting members or plates to effectively transmit rotary drive therebetween, and a compaction or compression roller of considerably larger diameter than those heretofore employed rotatably journaled about each pivot pin between the mounting members or plates and within the wafering chamber for rotation within the latter as the drive shaft rotates, thereby successively applying force to hay disposed opposite the entrance ends of the die cells for more efficiently compressing such hay into and therethrough to form the hay into wafers.

More specifically, the present invention contemplates an improved hay wafering apparatus of the general type aforementioned particularly characterized by roller mounting means for at least three rotatable compaction or compression rollers of relatively large diameter, such mounting means comprising a pair of spaced mounting members or plates with one thereof secured to the aforementioned rotatable drive shaft, and a plurality of pins or the like extending between the aforementioned members or plates at points substantially equidistantly spaced from the axis of rotation of the drive shaft to rotatably support the rollers between the members or plates and transmit drive therebetween, thereby eliminating the need for any extension of the drive shaft between the mounting members or plates and completely opening up the space therebetween to permit the use of rollers of considerably greater diameter than heretofore possible and effectively prevent a condition from occurring in which a collection of hay gathers in front of the rotative path of the rollers and is pushed in front thereof rather than being compressed through the die cells.

In addition, the improved apparatus of this invention is further characterized by a hopper for receiving hay to be wafered which communicates at one end thereof with the aforementioned wafering chamber, and auger means including a plurality of auger flights corresponding to the number of the compaction or compression rollers disposed within the hopper and secured to the other of the mounting members or plates for drive therefrom and rotation substantially coaxially with the rotatable drive shaft to feed hay from the hopper into the wafering chamber and lay it in advance of the rotative paths of the respective rollers.

An apparatus constructed in accordance with this invention, in addition to solving the problem aforementioned, provides other advantages not obtainable in prior apparatus of this type having a rotary hay feeding and compaction mechanism, including the combination of a two flight auger and two compaction or compression rollers. Thus, in its more specific aspects, the present invention is characterized by a rotary hay feeding and compaction mechanism including the combination of a three flight feed auger with three compaction rollers. As a consequence of this construction, hay is more uniformly distributed along the entrance ends of the die cells within the wafering chamber and, for any given complete revolution of the drive shaft, three rollers traverse and compact hay into each die cell thereby increasing the production rate of the wafers.

In order to facilitate an understanding of the invention, a preferred embodiment thereof will now be described with reference to the accompanying drawing in which:

FIGURE 1 is a perspective view of a hay wafering apparatus illustrating a preferred embodiment of the invention;

FIGURE 2 is an enlarged fragmentary vertical sectional view through the apparatus of FIGURE 1 illustrating certain details thereof; and FIGURE 3 is a fragmentary sectional view, partly broken away to illustrate certain details of the construction, taken on line 3—3 of FIGURE 2.

Referring now to the drawing, the numeral 10 in FIGURE 1 generally indicates a hay wafering apparatus comprising a frame 12 equipped with the usual ground-engaging wheel means 14 in the usual manner and a drawbar 16 adapted to be hitched to a suitable prime mover, such as an agricultural tractor, for drawing the frame along a field of mown hay. A suitable engine 18 is mounted on the frame and includes an output shaft, not shown, connected in a conventional manner to various instrumentalities of the apparatus to drive the latter as will become more fully apparent hereinafter. A control pedestal 20 is provided on the frame and mounts at the upper end thereof a control panel having instruments thereon for controlling the engine 18 and other instrumentalities of the apparatus. An adjustable foot 22 is provided as usual on the drawbar 16 to support the latter when the apparatus is not hitched to a towing prime mover.

The apparatus aforedescribed is adapted to be towed along a field of mown or cut hay, preferably with the hay arranged in windrows and having been preconditioned or processed in a known manner so as to consist of finely chopped, mixed and blended stem and leaf components forming a substantially homogenous mass. As the apparatus is towed along the field, the hay in a given windrow is adapted to be picked up in a suitable pick-up mechanism preferably of the well known wheeled rotary flail type indicated generally at 24 and comprising a plurality of rapidly rotatable flails or arms which pick up and direct the homogenized hay in an accompanying air stream into the delivery chute 26, which delivers the hay and air stream to an opening 28 in the upper end of a vertically disposed hopper indicated generally at 30.

Referring now more particularly to FIGURE 2, it may be seen that the hopper 30 comprises an annular axially downwardly and outwardly tapered upper section 32 having its lower end suitably secured as indicated at 34 to the upper end of an axially downwardly and inwardly tapered lower section 36 terminates a cylindrical wall portion 38 suitably secured within an annular housing 40 suitably supported on frame 12. A cylindrical axially extending duct 42 includes an open upper end 44 suitably rigidly secured to the upper end of the upper section 32 of the hopper, and depends therefrom interiorly and substantially coaxially of the hopper toward a lower open end 46 thereof.

As hay is delivered through the opening 28 into the upper section 32 of the hopper with its accompanying air stream, it is initially discharged into the hopper between the upper section thereof and the duct 42 and, due to the tapered configuration of the upper section of the hopper, the hay and air stream swirl axially downwardly in cyclone fashion in the space between the upper section of the hopper and the duct. As a result, the heavier particles of hay separate from the accompanying air stream, while the latter loses some of its velocity imparted thereto by the rapidly rotating flails of the rotary flail type pick-up mechanism 24 due to the downwardly increasing annular area defined between the wall of the upper section of the hopper and the wall of the duct. Consequently, the heavier hay particles swirl axially downwardly along the wall of the upper section of the hopper and then may engage the wall of the lower section thereof and travel toward wall portion 38 entering housing 40, while the accompanying air stream is vented to atmosphere by entering the lower open end 46 of the duct, passing therethrough and emerging exteriorly thereof through the upper open end 44 thereof. As a result of this cyclonic swirling type of separation of the hay particles from the accompanying air stream and venting of the latter to atmosphere, a build up to a back pressure is prevented within the hopper which otherwise would retard delivery of hay to be wafered through the opening 28 into the hopper.

A vertically disposed drive shaft 48 extends into the lower end of annular housing 40 and is suitably rotatably supported by bearing means 50 mounted on a floor member 52 within the housing, the drive shaft being suitably coupled to and driven by the engine 18 in a well known manner as by gearing disposed in housing 54 beneath housing 40. The upper end of the drive shaft extends through the floor member 52 and is suitably rigidly secured in rotatable drive transmitting relation to the substantially central portion of a preferably triangularly-shaped lower roller mounting member or plate 56 held in axially spaced relation to a similarly shaped upper mounting member or plate 58 by means of three pivot pins 60 extending therebetween and substantially equidistantly spaced from the axis of rotation of the drive shaft 48. Three compaction or compression rollers 62 are respectively rotatably journaled about the respective pivot pins 60, and are adapted to travel in rotative paths within a wafering chamber 64 immediately below the wall portion 38 at the lower end of the lower section 36 of the hopper and above floor member 52. At this point it should be noted that the compaction or compression rollers have substantially equal and relatively large diameters and include peripheral surfaces which travel closely adjacent to each other near the center of the respective lower and upper mounting members or plates 56 and 58 and, as illustrated particularly in FIGURE 3, to the extent that such peripheries of the rollers intercept an axial projection of the external configuration of the drive shaft 48.

A feed auger means is indicated generally at 66 in FIGURE 2 and comprises a hollow cylindrical hub 68 having its lower end suitably rigidly secured to the upper mounting member or plate 58 and projecting upwardly therefrom substantially coaxially with the drive shaft 48 and the hopper 30, and has mounted on the exterior surface thereof in the usual manner three auger flights 70 having their lower ends terminating immediately in advance of the rotative clockwise path of travel of the respective rollers 62 as indicated particularly in FIGURE 3. A conical head member 72 is secured at the upper end of the hub 68 and is secured to a rotatable shaft 74 supported at its upper end in bearing means 76 carried, by way of example, by a rib member 78 extending radially between opposite sides of the duct 42 at the upper open end of the latter. As will be apparent from FIGURE 2, the respective flights 70 of the feed auger means taper axially upwardly and inwardly from their lower ends toward their upper ends adjacent the conical head member 72.

It will now be apparent that the hay supplied to the hopper 30 will swirl axially downwardly thereof as previously described and will be fed axially of and somewhat radially inwardly toward the hub 68 and onto the respective flights 70 of the feed auger means. The tapered configuration of the respective flights of the feed auger means insure that a portion of each flight immediately below an upper portion thereof projects outwardly sufficiently from the latter so as to receive some of the hay so delivered, thereby contributing to optimum uniform distribution of the hay to the feed auger means for supply to the wafering chamber 64.

As the hay is so fed by the feed auger means into the wafering chamber 64, means are preferably provided for applying a desired amount of moisture to such hay prior to compaction or compression thereof by the rollers 62 as will be described hereinafter. In this regard, application of such moisture has been found to be desirable for various reasons including, by way of example, that of facilitating the tendency of the hay fibers to become more pliable, stick together and, in general, set into the desired shape upon completion of the wafering operation as will be described hereinafter. To this end, and referring particularly to FIGURES 1 and 2, a water pump 80 is provided on the frame 12 of the apparatus and is adapted to be driven in a suitable manner from the engine 18 to supply a stream of water through a conduit 82 suitably connected as by a rotatable sealing member 84 to the upper end of a similar type of conduit mounted for rotation with the shaft 74 interiorly of the latter and connected at its lower end through three individual conduits, not shown, interiorly of the auger hub 68 to openings, nozzles or the like 86 immediately adjacent lower portions of each of the respective flights 70 of the feed auger means in advance of the path of travel of the latter. As a result, a stream or spray of water may be supplied to the lower portion of each of the auger flights as the hay to be wafered passes axially therealong, thereby insuring that the hay receives a suitable amount of moisture for the purposes aforementioned immediately prior to entering the wafering chamber 64.

The wafering chamber 64 includes vertically spaced parallel annular die wall members 88 having fixedly disposed therebetween an annular or circumferentially spaced series of knife edges 90. An annular or circumferentially spaced series of pairs of side die wall members 92 and 94 are disposed between the die wall members 88, and have their radially inner ends suitably hingedly connected as indicated at 96 adjacent a respective fixed knife edge 90 to form an annular or circumferentially spaced series of axially open radially extending die cells 98 between die wall members 88 and the respective oppositely spaced side die wall members 92 and 94 of an adjacent pair thereof. As will be apparent, the axes of the respective die cells are contained in a common horizontal plane or plane parallel with the ground, and the entrance ends thereof communicate with wafering chamber 64.

Furthermore, the cross sections of the respective die cells preferably converge radially outwardly toward the exit ends thereof due to the fact that the respective oppositely disposed side die wall members forming a part of each die cell converge toward each other in this manner. In addition, an hydraulically operated motor assembly 100 of the type comprising relatively reciprocable piston and cylinder elements is interposed between each hinged pair of side die wall members 92 and 94 to control their angular relationship about the hinge point 96 and, hence, the extent to which the cross section of each die cell converges towards its exit end. Each of the motor assemblies aforementioned is connected through a conduit 102 to a common annular manifold 104 connected to a source of fluid under pressure controlled from the control panel or control pedestal 20. As a result, fluid under substantially equal pressure is supplied from the manifold 104 to each of the motor assemblies 100 to vary the angular relationship between the respective pairs of side die wall members 92 and 94 and the converging cross sections of the respective die cells to a substantially equal extent.

As will be readily apparent particularly from FIGURE 3, the rollers 62 are positioned closely to but do not engage the knife edges 90 and the entrance ends to the respective die cells 98. Thus, hay fed continuously by the auger feed means 66 from the hopper 30 into the wafering chamber 64 is laid across the knife edges 90 and the entrance ends of the respective die cells in advance of the rotative or clockwise path of the rollers in FIGURE 3, which rollers compact or compress the hay and force it past the knife edges and into and through the respective die cells upon successive rotative passes thereof.

At this juncture, it should be particularly noted that drive is conducted from the rotatable drive shaft 48 to the auger feed means 66 and particularly the hub 68 thereof through the axially spaced roller mounting members or plates 56 and 58 and, more specifically, through the pins 60 interconnecting the latter. This three point drive interconnection between the roller mounting members or plates is sufficient to resist torsional loadings and similar types of forces and stresses imposed thereon while completely opening up the space between such members or plates to enable the use of the compaction or compression rollers 62 which are of considerably larger diameter than those heretofore used in the art. As a result, as the rollers repeat their successive rotative passes around the wafering chamber 64 and along the entrance ends to the respective die cells 98, such rollers have a much higher angle of attack and contact relative to hay they are advancing upon, thereby more positively insuring that such hay will be compressed or compacted through the die cells rather than a collection thereof being pushed ahead of the rotative path of such rollers.

A drive sprocket 106 is secured to the drive shaft 48 beneath the floor member 52 within the annular housing 40, and is connected through the drive chain 108 to a sprocket 110 mounted on a vertical shaft suitably rotatably mounted within housing 40. A gear wheel 112 secured on this shaft engages an annular or circumferential spaced series of drive pins 114 of an annular conveyor mechanism including a plurality of annularly or circumferentially spaced conveyor paddles 116. The conveyor paddles travel in a continuous path about the exit ends of the die cells and are disposed immediately below the horizontal plane thereof. A suitable number of spaced break-off tabs 118 each upstand from respective ones of the conveyor paddles 116 and project into the horizontal plane of the die cells so as to be engageable with a radially outer portion of a given extrusion of hay emerging therefrom. As a break-off tab so engages an extrusion of compacted or compressed hay, the latter is caused to bend and break substantially at the exit end of its associated die cell to form a wafer which then drops onto the bottom of housing 40 and is conveyed therealong by the associated conveyor paddle. As will be appreciated, the gear reduction between the drive shaft 48 and the conveyor mechanism aforedescribed and, hence, the timing of the latter is such as to permit a predetermined length of extruded hay to overhang from the exit ends of the die cells before being engaged by a break-off tab 118.

The hay wafers which fall upon the bottom of housing 40 are moved therealong as aforedescribed until reaching an opening or the like therein, not shown, positioned above one end of an elevator type conveyor 120 of conventional construction equipped with spaced conveyor paddles 122 which pick up the hay wafers and convey them from the apparatus preferably into a trailing conveyance.

The embodiments of the invention in which an exclusive or privilege is claimed are defined as follows:

1. In an apparatus for making compressed hay wafers, and of the type having an annular series of die cells spaced about and having entrance ends thereof communicating with a chamber to receive hay therefrom to be wafered; the improvement comprising rotary hay compaction means including a rotary drive shaft, a pair of spaced mounting members, one only of said members being directly secured to said shaft to receive rotative drive from the latter, a plurality of compaction rollers, and means connected between said members to rotatably support said rollers in spaced relation therebetween and being the sole means to conduct drive between said members as said drive shaft rotates, whereby said rollers rotate about said chamber as said drive shaft rotates to successively apply force to hay disposed opposite the entrance ends of said die cells and compact such hay into and therethrough to form the hay into wafers.

2. In an apparatus for making compressed hay wafers, and of the type having an annular series of die cells spaced about and having entrance ends thereof communicating with a chamber to receive hay therefrom to be wafered; the improvement comprising rotary hay compaction means including a rotary drive shaft, a pair of spaced mounting members, one only of said members being directly secured to said shaft to receive rotative drive from the latter, a plurality of compaction rollers, means connected between said members to rotatably support said rollers in spaced relation therebetween and being the sole means to conduct drive between said members as said drive shaft rotates, whereby said rollers rotate about said chamber as said drive shaft rotates to successively apply force to hay disposed opposite the entrance ends of said die cells and compact such hay into and therethrough to form the hay into wafers, a hopper for receiving hay to be wafered communicating with said chamber, and rotatable feed means disposed within said hopper and secured to the other of said members for rotation with said drive shaft to feed hay from said hopper into said chamber.

3. The apparatus according to claim 2 in which said rotatable feed means comprises an auger including a plurality of auger flights corresponding to the number of said compaction rollers for feeding hay to be wafered from said hopper into said chamber in advance of the rotative paths of said rollers.

4. The apparatus according to claim 3 in which there are at least three compaction rollers and auger flights.

5. In an apparatus for making compressed hay wafers, and of the type having an annular series of die cells spaced about and having entrance ends thereof communicating with a chamber to receive hay therefrom to be wafered; the improvement comprising rotary hay compaction means including a rotary drive shaft, a pair of spaced mounting members, one only of said members being directly secured to said shaft to receive rotative drive from the latter, a plurality of compaction rollers, and pivot means being the sole means connected between said members to conduct drive therebetween as said drive shaft rotates and rotatably supporting said rollers at points substantially equidistantly spaced from the axis of rotation of said drive shaft to successively apply force to hay disposed opposite the entrance ends of said die cells and compact such hay into and therethrough to form the hay into wafers.

6. The appartus according to claim 5 further comprising a hopper for receiving hay to be wafered communicating with said chamber, and rotatable feed means disposed within said hopper and secured to the other of said members for rotation substantially coaxially with said drive shaft to feed hay from said hopper into said chamber.

7. The apparatus according to claim 6 in which said rotatable feed means comprises an auger including a plurality of auger flights corresponding to the number of said compaction rollers for feeding hay to be wafered from said hopper into said chamber in advance of the rotative paths of said rollers.

8. The apparatus according to claim 7 in which there are at least three compaction rollers and auger flights.

9. In an apparatus for making compressed hay wafers and of the type having an annular series of die cells spaced about and having entrance ends thereof communicating with a chamber to receive hay therefrom to be wafered; the improvement comprising rotary hay compaction means including a rotatable drive shaft, a pair of spaced mounting members, one only of said members being directly secured to said shaft to receive rotative drive from the latter, a plurality of compaction rollers, and spaced pivot means extending between and being the sole means connecting said members to conduct drive therebetween as said drive shaft rotates and rotatably supporting said respective rollers thereon at points substantially equidistantly spaced from the axis of rotation of said drive shaft to successively apply force to hay disposed opposite the entrance ends of said die cells and compact such hay into and therethrough to form the hay into wafers, said rollers having substantially identical chambers and being so spaced relative to each other that the peripheries thereof intercept an axial projection of the external configuration of said drive shaft.

10. The apparatus according to claim 9 further comprising a hopper for receiving hay to be wafered communicating with said chamber, and rotatable feed means disposed within said hopper and secured to the other of said members for rotation with said drive shaft to feed hay from said hopper into said chamber.

11. The apparatus according to claim 10 in which said rotatable feed means comprises an auger including a plurality of auger flights corresponding to the number of said compaction rollers for feeding hay to be wafered from said hopper into said chamber in advance of the rotative paths of said rollers.

12. In an apparatus for making compressed hay wafers, and of the type having an annular series of die cells spaced about and having entrance ends thereof communicating with a chamber to receive hay therefrom to be wafered; the improvement comprising rotary hay compaction means including a rotary drive shaft, a pair of spaced mounting members, one only of said members being secured to said shaft to receive rotative drive from the latter, a plurality of compaction rollers, pivot means connected between said members to conduct drive therebetween as said drive shaft rotates and rotatably supporting said rollers at points substantially equidistantly spaced from the axis of rotation of said drive shaft to successively apply force to hay disposed oposite the entrance ends of said die cells and compact such hay into and therethrough to form the hay into wafers, a hopper for receiving hay to be wafered communicating with said chamber, and rotatable auger means disposed within said hopper and secured to the other of said members for rotation substantially coaxially with said drive shaft to feed hay from said hopper into said chamber, said auger means including a plurality of auger flights corresponding to the number of said compaction rollers for feeding hay to be wafered from said hopper into said chamber in advance of the rotative paths of said rollers, said respective auger flights extending beyond said other of said members toward said one of said members between adjacent ones of said rollers.

13. In an apparatus for making compressed hay wafers, and of the type having an annular series of die cells spaced about and having entrance ends thereof communicating with a chamber to receive hay therefrom to be wafered; the improvement comprising rotary hay compaction means including a rotatable drive shaft, a pair of spaced mounting members, one only of said members being secured to said shaft to receive rotative drive from the latter, a plurality of compaction rollers, spaced pivot means extending between and connecting said members to conduct drive therebetween as said drive shaft rotates and rotatably supporting said respective rollers thereon at points substantially equidistantly spaced from the axis of rotation of said drive shaft to sucessively apply force to hay disposed opposite the entrance ends of said die cells and compact such hay into and therethrough to form the hay into wafers, said rollers having substantially identical diameters and being so spaced relative to each other that the peripheries thereof intercept an axial projection of the external configuration of said drive shaft, a hopper for receiving hay to be wafered communicating with said chamber, and rotatable auger means disposed within said hopper and secured to the other of said members for rotation with said drive shaft to feed hay from said hopper into said chamber, said auger means including a plurality of auger flights corresponding to the number of said compaction rollers for feeding hay to be wafered from said hopper into said chamber in advance of the rotative paths of said rollers, said respective auger flights extending beyond said other of said members toward said one of said members between adjacent ones of said rollers.

References Cited by the Examiner

UNITED STATES PATENTS

| | | | |
|---|---|---|---|
| 1,238,981 | 9/1917 | Barton | 100 |
| 1,484,179 | 2/1924 | McClure et al. | 100 |
| 2,063,404 | 12/1936 | Selman | 100 |
| 2,157,528 | 5/1939 | Crabtree | 107—8.25 |
| 2,178,009 | 10/1939 | Helm | 107—147 |
| 2,241,546 | 5/1941 | Evenstad et al. | 100 |
| 2,648,296 | 8/1953 | Oliver. | |
| 2,651,269 | 9/1953 | French | 100 |
| 2,843,989 | 7/1958 | McClellan | 56—24 X |
| 2,981,212 | 4/1961 | Landers. | |
| 3,064,811 | 11/1962 | Mumper | 55—459 X |
| 3,084,620 | 4/1963 | Gibbons | 100—71 |

FOREIGN PATENTS

| | | |
|---|---|---|
| 1,250,174 | 11/1960 | France. |
| 196,947 | 5/1923 | Great Britain. |
| 505,231 | 5/1939 | Great Britain. |
| 939,759 | 10/1963 | Great Britain. |

OTHER REFERENCES

Western Livestock Journal, April 1961, 100-Pelleters, pages 36 and 39.

Agricultural Engineering S.671.A3 August 1961, 56–1, pages, 413–415 and 423.

WALTER A. SCHEEL, *Primary Examiner.*